(12) United States Patent
Sahm et al.

(10) Patent No.: US 8,006,593 B2
(45) Date of Patent: Aug. 30, 2011

(54) TOOL REVOLVER

(75) Inventors: Detlef Sahm, Lichtenwald (DE); Kurt Birk, Reutlingen (DE); Jochen Dieringer, Hechingen-Stetten (DE); Ralf Kiessig, Riederich (DE)

(73) Assignee: Sauter Feinmechanik GmbH, Metzingen (DE)

( * ) Notice: Subject to any disclaimer, the term of this patent is extended or adjusted under 35 U.S.C. 154(b) by 447 days.

(21) Appl. No.: 11/991,179

(22) PCT Filed: Jul. 21, 2006

(86) PCT No.: PCT/EP2006/007188
§ 371 (c)(1),
(2), (4) Date: Nov. 24, 2008

(87) PCT Pub. No.: WO2007/031145
PCT Pub. Date: Mar. 22, 2007

(65) Prior Publication Data
US 2009/0090226 A1 Apr. 9, 2009

(30) Foreign Application Priority Data
Sep. 13, 2005 (DE) .......................... 10 2005 045 662

(51) Int. Cl.
*B23B 29/24* (2006.01)
*B23B 29/00* (2006.01)
(52) U.S. Cl. .......................................... 82/158; 82/159
(58) Field of Classification Search .................. 82/120, 82/121, 129, 158, 159, 160
See application file for complete search history.

(56) References Cited

U.S. PATENT DOCUMENTS

| 5,875,696 | A  | * | 3/1999 | Grossmann ..................... 82/159 |
| 5,921,159 | A  |   | 7/1999 | Watkins |
| 6,003,415 | A  | * | 12/1999 | Turner et al. ..................... 82/159 |
| 6,789,299 | B1 | * | 9/2004 | Kidder ................................ 29/39 |
| 7,243,407 | B2 | * | 7/2007 | Daris ............................. 29/38 C |
| 7,581,472 | B2 | * | 9/2009 | Miyairi et al. .................. 82/121 |

FOREIGN PATENT DOCUMENTS

| DE | 295 19 933 | 2/1996 |
| DE | 197 32 966 | 2/1999 |
| DE | 199 19 236 | 11/2000 |
| DE | 199 58 461 | 3/2001 |
| EP | 0 343 347 | 11/1989 |
| WO | WO 93/23191 | 11/1993 |

* cited by examiner

*Primary Examiner* — Will Fridie, Jr.
(74) *Attorney, Agent, or Firm* — Roylance, Abrams, Berdo & Goodman, LLP

(57) ABSTRACT

A tool revolver, in particular for a machine tool, includes a tool disk (1) rotatable about a revolver axis and provided with a plurality of tool stations distributed along the disk circumference and movable to an operation position by the disk (1) rotation. At least one part of the tool stations (13) has a reception area (25) for receiving a tool holder (3). A fixing device is used for fixing a corresponding tool holder (3) at a defined position in the reception area (25). The interaction between an elastic adjusting body (31) protruding perpendicularly to the reception area (25) and used in the form of an orientation element for positioning and adjusting surfaces (41, 43) deepened into a base surface (7) of the tool holder (3) enables the tool holder to take an adjustment position when a screw fitting is fastened.

16 Claims, 3 Drawing Sheets

TOOL REVOLVER

FIELD OF THE INVENTION

The invention relates to a tool revolver, in particular for machine tools, having a tool disk which can turn around the revolver axis, and which has a plurality of tool stations distributed along its periphery. The tool stations can be set by turning the tool disk into at least one working position at a time. On at least some of the tool stations, a receiver for a tool holder and one fastening means each are provided to fix the respective tool holder on the pertinent receiver in defined positioning.

BACKGROUND OF THE INVENTION

Tool revolvers of this type are known, for example, in publication WO 93/23191. Due to the possibility of being able to position tool holders with various machining tools in rapid alternation by controlled rotation of the tool disk, these tool revolvers are advantageously used to a large extent in industrial engineering.

The disadvantage in these tool revolvers is that when the machining tools are being changed, when the pertinent tool holders are to be mounted on the receiver of the tool disk, the tool holder on the receiver must be adjusted to align the machined workpiece to the desired position. For known tool revolvers of the aforementioned type, adjustment must be done using adjustment screws for each tool holder.

SUMMARY OF THE INVENTION

An object of the invention is to provide a tool revolver ensuring that the pertinent tool holders assume an exactly defined setting position when they are being fixed on the receiver of the tool disk by the fastening means.

According to the invention, this object is basically achieved by a tool revolver where the arrangement for positioning as an alignment means has at least one fitting body projecting out of the receiver and being elastically resilient perpendicular to it, and fitting surfaces recessed in the base surface of the tool holder for interaction with at least one fitting body. The tool holder then assumes the exact, desired setting position when the screws are tightened. Therefore, the invention avoids the requirement of taking adjustment measures each time the tool holder is used.

In advantageous embodiments, the receiver on the respective tool stations is a plate connected to the tool disk. The flat surface of the plate lies radially outside relative to the revolver axis and borders contact surfaces of the tool disk on both sides. The contact surfaces extend in the plane parallel to the revolver axis and with which the respectively assignable tool holder with its base surface can be brought into contact. For bracing with the base surface of the tool holder to be attached, which surface is made to fit the respective contact surface in shape and dimension, a large-area, flat contact surface is available. This feature promotes especially reliable fixing by screw joints.

In especially advantageous embodiments, on both ends of the plate on its longitudinal axis, one fitting body each is provided so that alignment takes place advantageously at alignment sites spaced far apart.

The fitting bodies can have the shape of a prismatic body which is blunt on the top. Away from its top to both sides of the longitudinal axis, flat fitting flanks diverge from one another extending down and defining planes parallel to the longitudinal axis of the plate.

To enable spring resilience of the fitting bodies, this elastic resilience is at extremely high spring constants and should take place with deflections lying each only in the micron range. In the area underneath the fitting bodies, a slight clearance can be between the bottom of the plate and the facing surface of the tool disk.

The fitting surfaces of the respective tool holder interacting with the fitting bodies of the plate can be formed by inside surfaces of at least one groove recessed in the base surface of the tool holder.

Preferably, the respective groove in the base surface extends over a longitudinal area beyond the area of the respective fitting body. The arrangement can be made such that for each fitting body a groove with inside surfaces is provided which need not form flat surfaces. Rather, the groove base and/or side surfaces is or are crowned such that the groove depth and/or groove width proceeding from its open end decreases inwardly.

Alternatively there can be a single groove having flat fitting surfaces and made continuous in the base surface of the tool holder for the two fitting bodies.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
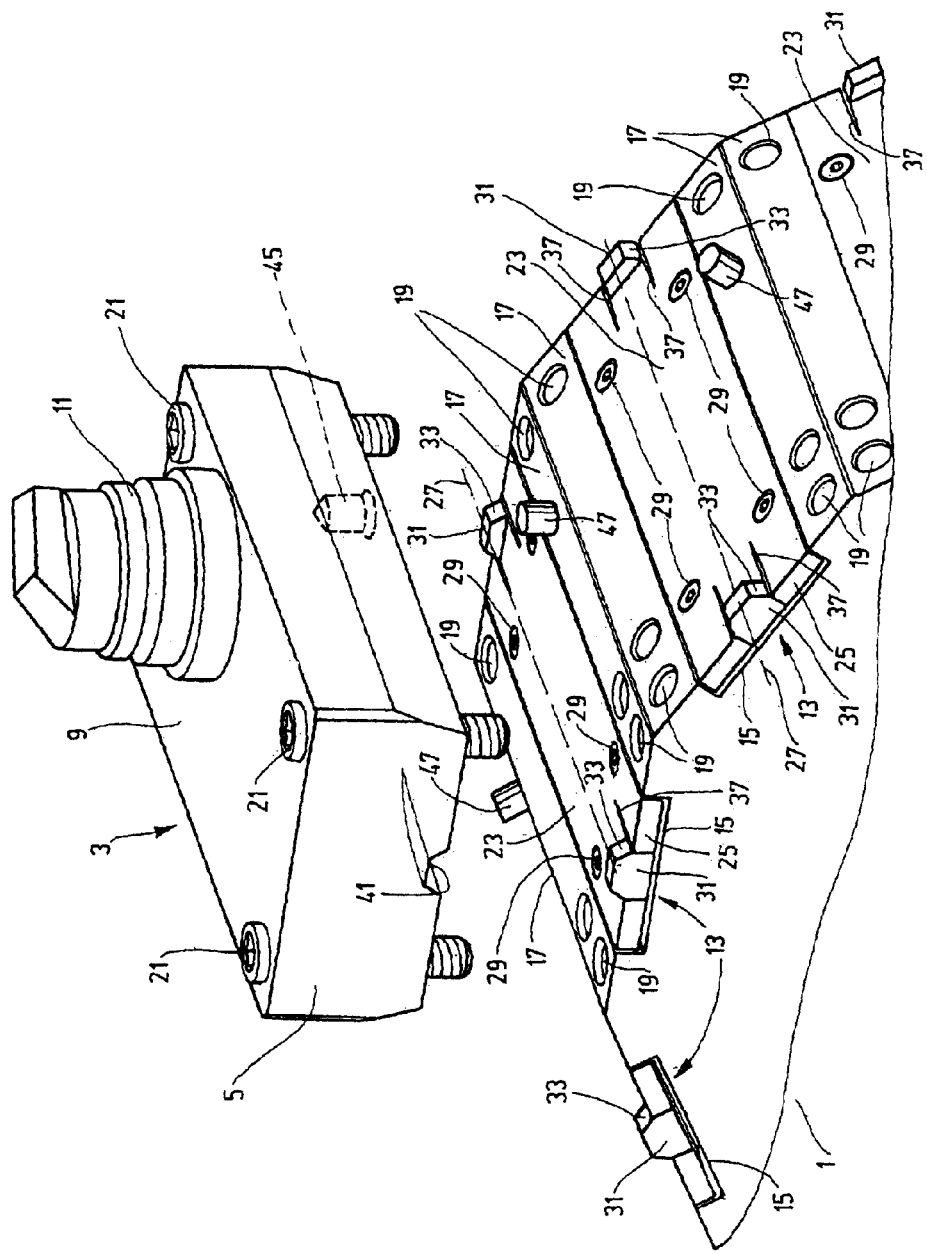
FIG. 1 is a partial, exploded perspective view of a peripheral section of the tool disk of a tool revolver according to a first exemplary embodiment of the invention, with a tool holder being shown in the position raised off the receiver on the tool disk.
Figure 2:
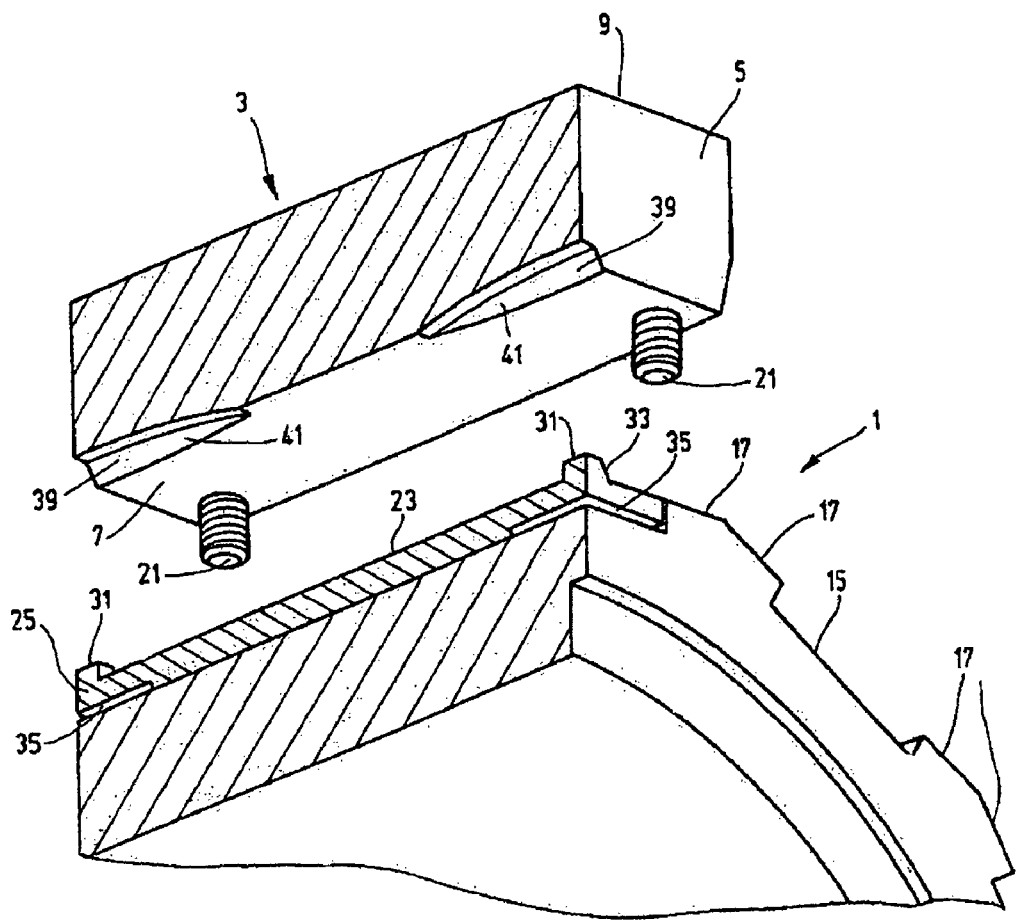
FIG. 2 is a partial perspective view in section of the area of a receiver on the tool disk and one half of the tool holder to be attached to this receiver of the tool revolver of FIG. 1.
Figure 3:
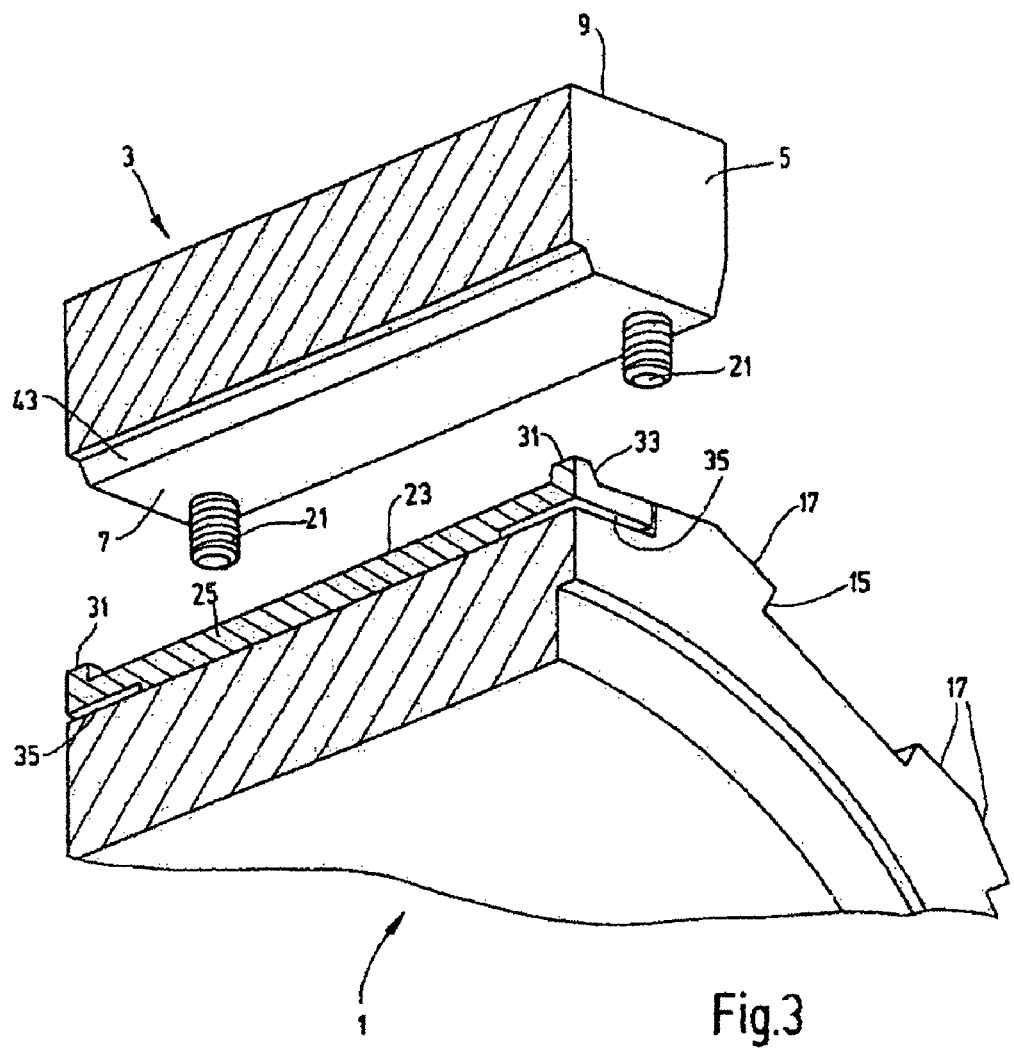
FIG. 3 is a partial perspective view in section of the area of a receiver on the tool disk and one half of the tool holder to be attached to this receiver of a tool revolver according to a second exemplary embodiment of the invention.

FIG. 1 shows a peripheral section of a tool disk 1 that is a component of a tool revolver. Since the other components of the tool revolver not shown in this drawing can be of conventional design, a more detailed explanation of those conventional components is unnecessary. FIG. 1 moreover shows a tool holder 3, shown in a position raised off the tool disk 1, i.e., before mounting on the pertinent receiver of the tool disk 1. The tool holder 3 has a base body 5 which is largely cuboidal with a rectangular outline. The base body 5 has a bottom-side, flat base surface 7 (FIGS. 2 and 3). From the flat top 9, a machining tool 11 sits in the base body 5 and extends up. In this example, the machining tool is a lathe tool shown highly schematically simplified. As is apparent from FIG. 1, the machining tool 11 is offset out of the central area of the top 9.

The tool disk 1 on its outer periphery conventionally has a plurality of tool stations 13, each forming a peripheral side flat surface on the tool disk 1. These flat surfaces extend parallel to the revolver axis (not shown). Each tool station 13 has a depression 15 rectangular in outline and located centrally between unrecessed, lateral mounting or longitudinal contact surfaces 17. The mounting surfaces 17 have threaded holes 19 permitting screwing down a tool holder 3 to be fixed on the pertinent tool station by tightening screws 21 received in the base body 5 of the holder.

On each tool station 13, for each tool holder 3 which is to be attached, a receiver forms a plate surface 23 which is flat to the top. This plate surface 23 is bordered on both sides along its longitudinal edges by the longitudinal contact surfaces 17 of the tool disk 1. Surfaces 17 can project with their top slightly over the top of the plate surface 23 so that the respective tool holder 3 with its base surface 7 on the edge sides sits on the respective contact surfaces 17. Relative to this attachment position, the tool holder 3 can then be attached with its base body 5 via tightening screws 21 as the fastening means on the top of the tool disk 1 in the area of the respective receiver 25. The plate surface 23 largely forms the shape of a rectangular parallelepiped defining a central longitudinal axis 27 extending parallel to the revolver axis. Each of these plates 25 can be attached in the pertinent depression 15 by a mounting screw 29 countersunk in the flat plate surface 23 in an accurately defined alignment position on the tool disk 1.

The plates 25 have on the longitudinal axis 27, one fitting body 31 on each of the two plate ends which projects out of the plate surface 23. Each fitting body 31 has a prismatic shape flattened on the top. Proceeding from the flat top, oblique fitting flanks 33 diverge from one another extending down to the two sides of the longitudinal axis 27. If the fitting body 31 has crowned oblique fitting flanks 33, line contact with increased adjustment accuracy for the tool holder 3 arises.

As is apparent from the drawings, particularly FIGS. 2 and 3, underneath the fitting body 31 on the bottom of each plate 25 a clearance 35 is shown exaggerated in the drawings, and is formed by the reduction of the thickness of the plate 25 in areas. In the plate 25, narrowly limited elastic resilience of the fitting bodies 31 in the direction perpendicular to the plate surface 23 arises. The linear impression or depression grooves 37 can run laterally from the respective fitting body 31. On the whole, spring resilience is formed with a very high spring constant and a correspondingly small spring path, preferably in the micron range.

For interaction with the fitting bodies 31, on the base surface 7 of the tool holder 3, fitting surfaces are recessed in the base surface 7. In the first embodiment shown in FIGS. 1 and 2 inside surfaces 39 of each groove 41 are machined into the base surface 7 and provided specially for each fitting body 31. As is apparent, the groove 41 is open on the end of the base surface 7, has the greatest groove depth and groove width on the open end, and extends, proceeding from the open end, with slightly crowned inside surfaces over a longitudinal area extending beyond the area of the fitting body 31. The crown of each groove 41 is chosen such that the groove width and groove depth decrease. A preferred version with grooves extending in a straight line is also possible.

As a result of the interaction of the fitting flanks 33 with the fitting surfaces of the groove 41 of the tool holder 3 and the fitting bodies 31 being elastically resilient with a high spring constant, an extremely accurately defined positional relationship between the plate 25 forming the respective receiver on the tool disk 1 and the base body 5 of the tool holder 3 is ensured. For positionally defined attachment of the plate 25 to the tool stations 13 of the tool disk 1, which can take place using a calibrated rule, for example a so-called master part, each tool holder 3 is adjusted with its base body 5 and the plate 25, and necessarily assumes the exact, desired setting position so that replacement and/or attachment of the tool holders 3 to the tool disk 1 can take place without more extensive adjustment measures.

FIG. 3 shows a second embodiment differing from the example of FIGS. 1 and 2 only in that instead of separate grooves 41 provided in the first embodiment for each fitting body 31, a continuous groove 43 extends along the longitudinal axis. There is no crowning of the inner surfaces so that in this example flat fitting surfaces are formed which interact with the fitting bodies 31. This second embodiment can be advantageously used when absolute position definition along the longitudinal axis is not important for the intended application. If this applies, in this embodiment the advantage can be exploited that feeding of the tool holder 3 for attachment to the receiver of the tool station 13 and taking away of a tool holder 3 which is to be removed from the receiver on the tool disk 1 can take place with a displacement motion along the longitudinal axis 27. This embodiment can promote execution of automated tool changing processes.

To fix the position of the tool holder 3 in the direction of the longitudinal axis, in the base body 5 of the tool holder 3, one blind hole 45 is open on the base surface. The blind hole 45 is offset out of the central area and receives a respective pin 47 projecting out of the fastening surface 17 when the tool holder 4 is attached to the tool station 13. In this respect, a pin fit is implemented.

While various embodiments have been chosen to illustrate the invention, it will be understood by those skilled in the art that various changes and modifications can be made therein without departing from the scope of the invention as defined in the appended claims.

What is claimed is:

1. A tool revolver for machine tools, comprising:
   a tool holder, having a base surface with fitting surfaces recessed therein;
   a tool disk rotatable about a revolver axis;
   a plurality of tool stations on a periphery of said tool disk and setable sequentially in working positions by rotating said tool disk about said revolver axis;
   a receiver on each of at least some of said tool stations for said tool holder;
   a fastener on each said receiver to fix said tool holder on the respective receiver in a defined position; and
   a first fitting body projecting outwardly on each said receiver for aligning said tool holder on the respective receiver, each said fitting body being elastically resilient in a direction perpendicular to the respective receiver and interactable with said fitting surfaces.

2. A tool revolver according to claim 1 wherein
   a clearance is between each said receiver and said tool disk adjacent each said fitting body for elastic resilience of each said fitting body.

3. A tool revolver according to claim 1 wherein
   each said receiver comprises a plate connected to said tool disk and has a flat surface facing radially outwardly relative to said revolver axis and being bordered by contact surfaces of said tool disk on both sides thereof, each said contact surface extending in a plane parallel to said revolver axis and contacting said base surface of said tool holder mounted thereon.

4. A tool revolver according to claim 3 wherein
   each said fastener comprises a screw that braces said base surface of said tool holder with the respective contact surfaces of said tool disk.

5. A tool revolver according to claim 3 wherein
   each said plate is a parallelepiped with a rectangular outline defining a central axis parallel to said revolver axis.

6. A tool revolver according to claim 5 wherein
each said receiver comprises a second fitting body projecting outwardly thereon and being elastically resilient in the direction perpendicular to the respective receiver and interactable with said fitting surfaces.

7. A tool revolver according to claim 5 wherein
a clearance is between each said receiver and said tool disk adjacent each said fitting body for elastic resilience of each said fitting body.

8. A tool revolver according to claim 6 wherein
each said fitting body comprises a prismatic body with a blunt top and fitting flanks diverging from one another, extending from said blunt top and defining planes parallel to said central axis of the respective plate.

9. A tool revolver according to claim 8 wherein
a small clearance extends between a bottom of each said plate and a facing surface of said tool disk adjacent each said fitting body to enable spring resilience thereof.

10. A tool revolver according to claim 6 wherein
said fitting surfaces comprise the inner surface of at least one groove in said base surface of said tool holder.

11. A tool revolver according to claim 10 wherein
said groove extends over a longitudinal area of said base surface, beyond an area of the respective fitting bodies and along said central axis when said tool holder is mounted on one of working stations.

12. A tool revolver according to claim 6 wherein
each said fitting body on the respective plate is received in a groove extending over a partial length of said base surface of said tool holder, with at least one of a depth and a width of said groove decreasing inwardly preceding from an open end thereof by being crowned.

13. A tool revolver according to claim 6 wherein
said fitting surfaces are flat and define a continuous groove receiving said first and second fitting bodies of the respective receiver.

14. A tool revolver according to claim 3 wherein
each said plate is mounted on said tool disk by a screw union in an exactly defined alignment position determined by a rule.

15. A tool revolver according to claim 14 wherein
said rule is a master part.

16. A tool revolver according to claim 1 wherein
said base surface has one of a pin and a hole; and
each said receiver has one of a mating hole and a mating pin engaging the one of the pin and the hole on the base surface to position said tool holder along a longitudinal axis of the respective receiver.

* * * * *